United States Patent [19]

Ahrné

[11] Patent Number: 4,894,243
[45] Date of Patent: Jan. 16, 1990

[54] METHOD OF REDUCING THE HEALTH RISKS DURING THE HANDLING OF PACKAGED NON-STERILIZED FOODSTUFFS

[75] Inventor: Lennart Ahrné, Bjärred, Sweden

[73] Assignee: AB Tetra Pak, Lund, Sweden

[21] Appl. No.: 78,114

[22] Filed: Jul. 27, 1987

[30] Foreign Application Priority Data

Aug. 14, 1986 [SE] Sweden .................................. 8603420

[51] Int. Cl.$^4$ ................................................ A23C 9/12
[52] U.S. Cl. ........................................ 426/43; 426/56; 426/61; 426/8; 426/324; 426/580
[58] Field of Search .................... 426/56, 61, 2, 8, 580, 426/324, 43

[56] References Cited

U.S. PATENT DOCUMENTS

| 644,624 | 3/1900 | Muller | 426/43 |
|---|---|---|---|
| 1,327,308 | 1/1920 | Buel | 426/43 |
| 1,903,014 | 3/1933 | Myers | 426/43 |
| 1,985,622 | 12/1934 | Reichel | 426/61 |
| 4,205,132 | 5/1980 | Sandine et al. | 426/43 |
| 4,579,734 | 4/1986 | Hata et al. | 426/8 |

FOREIGN PATENT DOCUMENTS

| 0092183 | 10/1983 | European Pat. Off. . |
|---|---|---|
| 452682 | 8/1936 | United Kingdom . |
| 1530476 | 11/1978 | United Kingdom . |
| 1549196 | 7/1979 | United Kingdom . |
| 1579926 | 11/1980 | United Kingdom . |

OTHER PUBLICATIONS

Brock, Biology of Microorganisms, 3rd Ed., Prentice-Hall, Inc., pp. 703–707.

Primary Examiner—Donald E. Czaja
Assistant Examiner—Helen Pratt
Attorney, Agent, or Firm—Burns, Doane, Swecker & Mathis

[57] ABSTRACT

In order to prevent health risks which may occur if packaged, non-sterilized foodstuffs such as milk and similar sensitive dairy products are subjected during transport, storage etc. prior to consumption to accidental bacteria-promoting conditions, e.g. temperatures above the highest recommended temperature, innocuous bacteria are added to the foodstuffs before and/or directly following their packaging in a quantity sufficient to compete out, and thereby eliminate the risk of multiplication dangerous to health of, harmful, in particular pathogenic, bacteria in the packaged product.

7 Claims, No Drawings

METHOD OF REDUCING THE HEALTH RISKS DURING THE HANDLING OF PACKAGED NON-STERILIZED FOODSTUFFS

The present invention relates to a method for reducing the health risks during the handling of packaged, non-sterilized foodstuffs in connection with transport, temporary storage etc. prior to consumption.

Foodstuffs are generally furnished at present in complete, closed consumer packages which are formed, filled and closed in conventional packing machines and subsequently are transported further so as ultimately to reach the individual consumer. Where such sensitive products as milk and similar dairy products are concerned it will be readily understood that the packaging and the following handling of the packaged article have to be carried out under specially monitored conditions in order to keep the packaged product as free as possible from harmful, in particular pathogenic, bacteria which would rapidly impair the quality of the product and even render it actually unfit for consumption. The product which is to be packaged is subjected, therefore, as a rule, to some kind of bactericidal pretreatment, and if, for example, milk is concerned such a pretreatment means that the milk prior to packaging is heated or pasteurized in order to reduce the risk of the survival of harmful micro-organisms to a prescribed low level, acceptable from a point of view of health. The packaged, preheated (non-sterilized) product subsequently has to be kept cooled (below 7°–10° C.) during the guaranteed keeping period up to the time of consumption, so as to create the most unfavourable conditions possible for the growth and multiplication of any harmful micro-organisms which have survived the pretreatment of the product.

Even if the packaging and the subsequent handling of the packaged product take place normally and in the great majority of cases under the conditions for maintaining the product at least during the guaranteed keeping period of the same as free from health risks as possible, it is almost impossible nevertheless in practice to guard in each individual instance against accidental disturbances of, and departures from, the normal, recommended handling. Thus it may happen, for example, that the packaged, non-sterilized product during transport or handling is exposed accidentally to temperatures above the highest permissible temperature (7°–10° C.) because of unforeseen accidental failures in a cooling system, which at worst may bring about a certain increase of surviving harmful micro-organisms in the packaged article.

It is an object of the present invention, therefore, to reduce the health risks which may arise possibly when a packaged, non-sterilized foodstuff during transport, storage, etc. were to be exposed accidentally to conditions which depart from the recommended, prescribed handling and which in special, unfavourable cases may bring about a growth and multiplication of quality-impairing micro-organisms, in particular pathogenic bacteria, in the packaged product which are unacceptable from a point of view of health.

This object is achieved in accordance with the present invention in the manner which is defined in the following claim 1, and which in accordance with preferred embodiments has been given the characteristics defined in more detail in the subsidiary claims 2–5.

The invention will now be described and explained in greater detail as applied to packaged, non-sterilized milk, but, to be fair, it should be added that the invention, of course, is not limited in any way to the particular example chosen here, but applications to packaged, non-sterilized foodstuffs in general naturally are possible and should be obvious to those versed in the art within the scope of the terms arising from the description stated in the following claims.

As mentioned previously milk is packaged and furnished as a rule in complete consumer packages which are formed, filled and closed in a conventional packing machine on the spot in a dairy, and transported from here to a shop and further to the consumer. A well-known package of this type is TetraBrik (registered trademark) which is manufactured in that a web of packing material (usually plastic-coated paper) is converted first to a tube by joining together the longitudinal edges of the web, whereafter the tube is filled with the intended contents (e.g. milk) and is divided into individual consumer packages by means of transverse sealing of the filled tube, package shaping and finally separation of the packages by means of cuts in the transverse sealing zones.

The milk which is to be packaged in such a package is subjected first to a pretreatment which in the first place aims at eliminating disease-provoking (pathogenic) bacteria and reducing the number of quality-impairing, harmful micro-organisms to prescribed, healthwise acceptable, low levels and which in most cases means that the milk is heated to a given temperature/time scheme and thereafter is cooled and packaged. Such a pretreatment (e.g. pasteurization) is quite sufficient for the complete elimination of living pathogens, that is to say disease-provoking bacteria, but is, on the other hand, insufficient for the achievement of a complete killing of so-called spores which are more resistant, and generally survive these treatments. Such surviving organisms involve normally no health risks for the consumer, if the packaged product during its guaranteed keeping period is handled according to prescribed recommendations and thus is not exposed to growth-provoking temperatures. However, as mentioned previously, it may happen in unfavourable cases that the product, at least temporarily, may meet with unforeseen operational failures during transport, storage etc., and so as to minimize the health risks which such accidental disturbances during handling may bring about, a culture of harmless bacteria is added to the pretreated milk before and/or directly following the filling into the package in a quantity sufficient to compete out, and thereby prevent undesirable increase of, surviving or reinfection bacteria under the unfavourable circumstances here referred to which may occur in connection with transport, storage etc. of the packaged product. The quantity of the harmless bacteria thus added in accordance with the invention ought to be sufficiently large to guarantee the intended competing out of the undesirable micro-organisms.

An example of appropriate harmless bacteria which may be added to the pretreated milk in accordance with the invention are carefully selected strains of Lactobacillus, Lactococci and Leuconostocci either by themselves or in combinations with one another. The bacteria here mentioned should present a vigorous growth at temperatures above 7°–10° C., which are the highest permissible temperatures for packaged, non-sterilized milk and/or have the capacity of checking the growth of any pathogenic bacteria possibly occurring, and the only effect the bacteria have on the quality of the milk is that after a sufficiently long period of multiplication they impart to the milk a slightly sourish taste which the consumer can easily recognize, and he thus receives a clear indication that the milk has been exposed to inappropriate handling, without thereby being exposed himself to any serious health hazard.

The harmless bacteria are added appropriately in the form of a liquid suspension advantageously containing at least 100 cfu/ml of bacteria, and it is particularly appropriate in accordance with the invention for this addition to be carried out with the least possible mixing in of "foreign" matter. This may be achieved, for example, in that the bacteria, preferably in freeze-dry condition, are suspended in a first small fraction of the milk or the product which is to be packaged, in a storage tank in direct connection to the product duct of the packing machine, and are metered out from this tank in suitable amounts into the product stream in the main duct or in a branch duct connected to the main duct for a small volume fraction of the milk or other product which is to be packaged.

As has been pointed out earlier, the pretreated (pasteurized) non-sterilized milk only constitutes one example of a foodstuff whose handling can be made safe from a point of view of health by the method in accordance with the invention, but it will be very obvious to those versed in the art, that the concept of the invention may be applied to similar, sensitive dairy goods and other types of foodstuffs which are to be packaged and handled (transported, temporarily stored etc.) prior to consumption. Irrespectively of the type of foodstuff concerned, the result aimed at from a point of view of health is thus achieved in accordance with the invention in that to the product chosen, which is to be packaged, is added before and/or directly following the packaging a culture of innocuous bacteria of the type which at temperatures above the highest temperature permissible for the packaged product produces a sufficiently vigorous multiplication so as to compete out, and thereby prevent multiplication of, harmful micro-organisms which have survived the preceding product treatment or on subsequent occasions inadvertently have been allowed access to the packaged article.

I claim:

1. A method for reducing health risks during handling of packaged, non-sterilized milk comprising the steps of:
    adding bacteria including Lactobacilli, Lactococci, or Leuconostocci to the milk at least one of before and directly following the packaging of the milk;
    the bacteria not being capable of substantial growth at temperatures below 7°–10° C. capable of provoking growth of harmful microorganisms; and the bacteria being added in an amount effective to compete out and prevent multiplication of undesirable bacteria in the packaged milk upon exposure of the milk to temperatures higher than 7°–10° C. capable of provoking growth of harmful microorganisms.

2. A method in accordance with claim 1 wherein the chosen bacteria are added to the milk or the other dairy product, which is to be packaged, in the form of a liquid suspension containing at least 100 cfu/ml.

3. A method in accordance with claim 2 wherein the suspension contains a smaller fraction by volume of the milk or other product which is to be packaged.

4. A method in accordance with claim 2 wherein the bacteria suspension is prepared by suspending the bacteria in the freeze-dry condition.

5. The method in accordance with claim 1 wherein said harmful microorganisms are pathogenic.

6. A method for reducing health risks during handling of packaged, non-sterilized milk to be stored at normal storing temperatures comprising the steps of:
    adding innocuous bacteria to the milk at least one of before and directly following the packaging of the milk into a packing container in a quantity sufficient to compete out and thereby prevent multiplication of undesirable bacteria in the packaged milk if the milk during its handling unintentionally will be exposed to temperatures higher than the normal storing temperatures;
    the bacteria including Lactobacilli, Lactococci, or Leuconostocci having the capability of growing at temperatures above 7°–10° C. but not or substantially not at temperatures below 7°–10° C.; and
    said bacteria being added to the milk as a liquid suspension containing at least 100 cfu/ml.

7. The method of claim 6 wherein the bacteria suspension is prepared by suspending the bacteria in freeze-dry condition.

* * * * *